April 15, 1930.  G. F. SCHMIDT  1,754,773
GAS GENERATOR AND DISTRIBUTOR
Filed Dec. 12, 1927  3 Sheets-Sheet 1
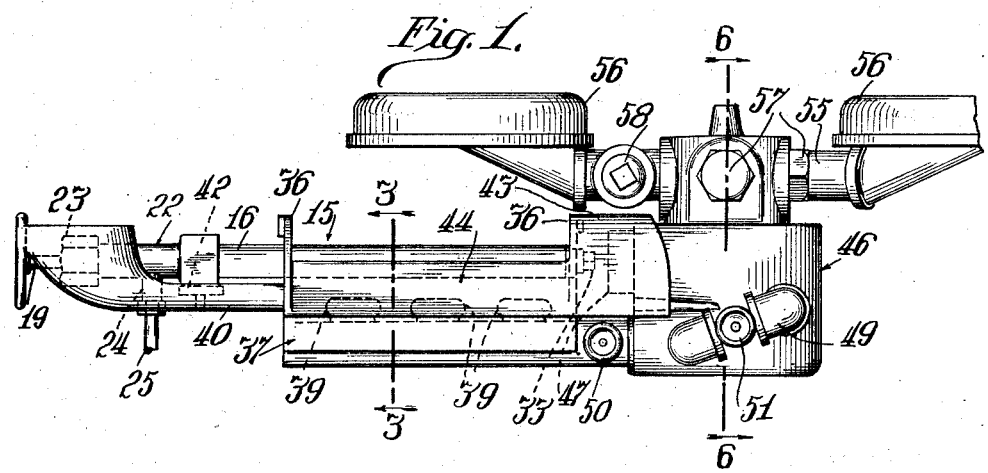
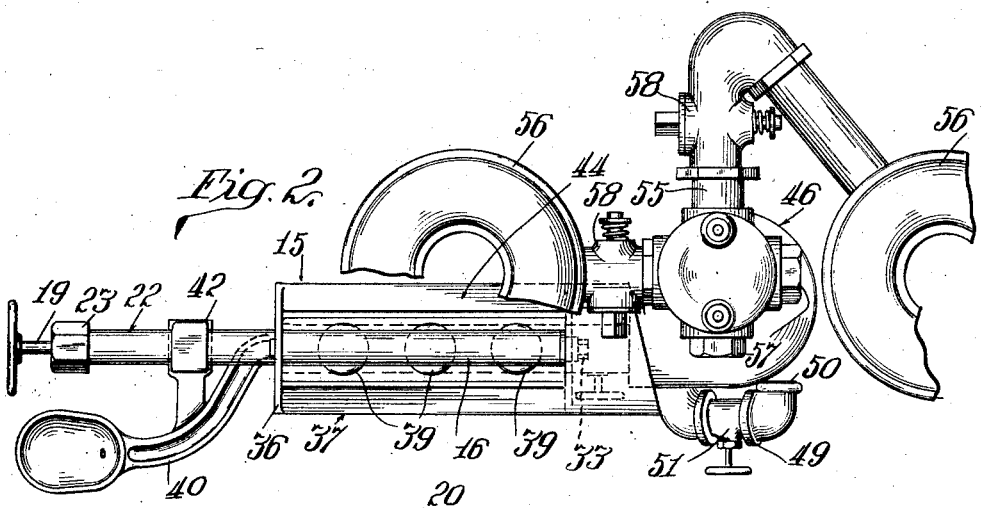
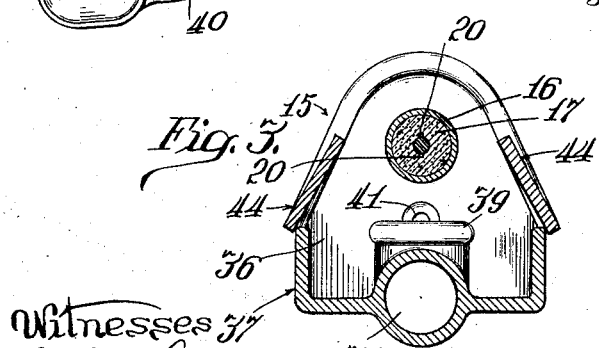

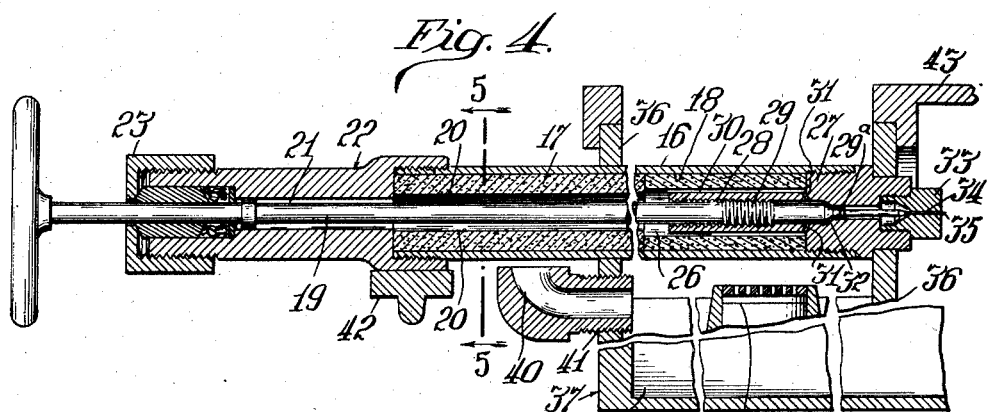
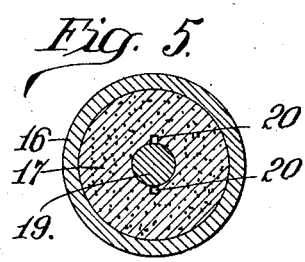
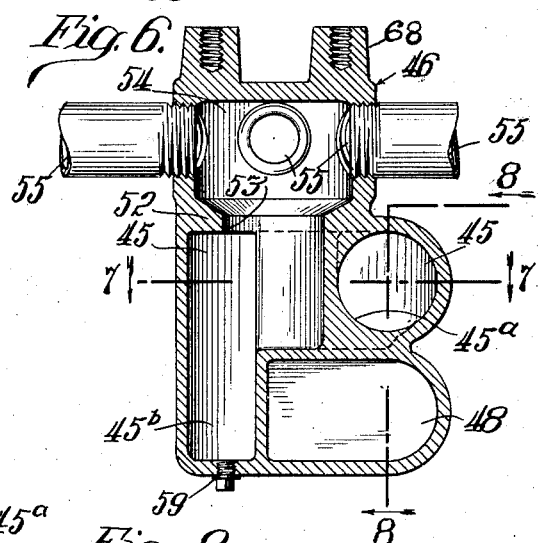
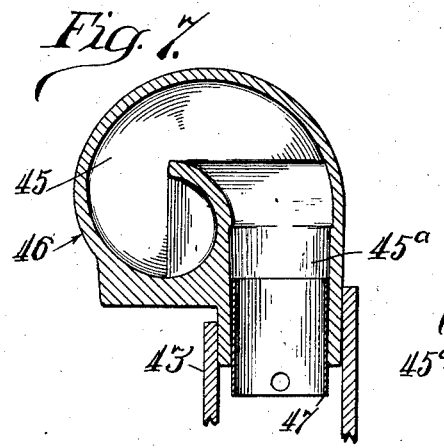
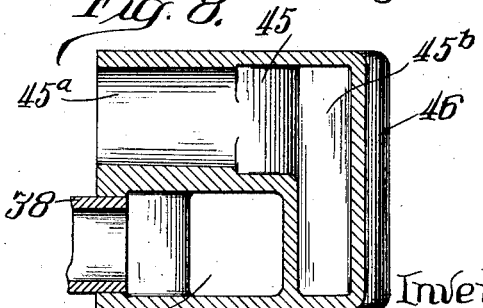

April 15, 1930.  G. F. SCHMIDT  1,754,773
GAS GENERATOR AND DISTRIBUTOR
Filed Dec. 12, 1927  3 Sheets-Sheet 3
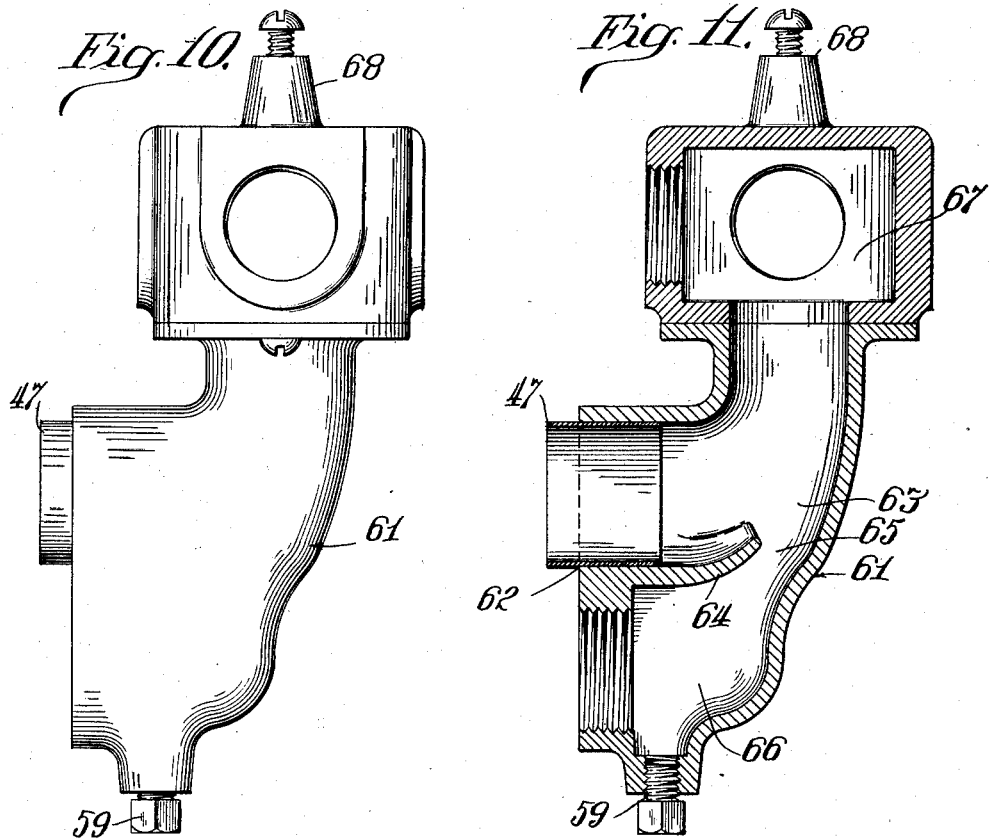
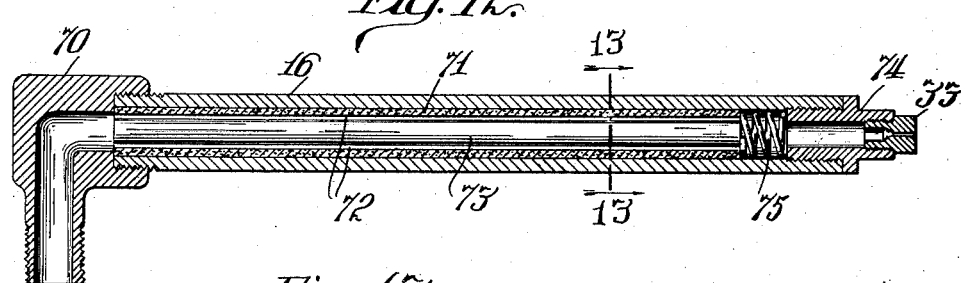
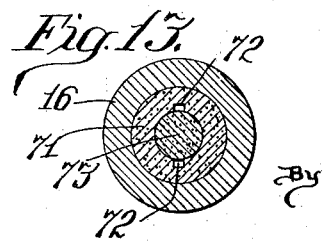

Patented Apr. 15, 1930

1,754,773

UNITED STATES PATENT OFFICE

GUSTAVE F. SCHMIDT, OF HOLLYWOOD, CALIFORNIA

GAS GENERATOR AND DISTRIBUTOR

Application filed December 12, 1927. Serial No. 239,350.

My invention relates to a generator for vaporizing and gasifying hydrocarbon fuel and more especially kerosene; the invention having for its object the provision of a generator whereby rapid and complete vaporization and gasification of the kerosene will be obtained.

Another object of my invention is to provide a generator wherein the fuel is made to travel in thin films or minute quantities in contact with walls of heat retaining quality, namely walls formed of refractory material or non-porous carbon, whereby a catalytic action will be obtained and the formation of carbon prevented, as contact of the fuel with the excessively heated metal portions or outer casings of the generator is prevented.

Another object of my invention is to provide a structure wherein all the hydrocarbon which is admitted into the generator will be vaporized in advance of its discharge into the mixing chamber portion of the generator; said mixing chamber portion involving means for regulating the admission of air and being provided with suitably heated passages for effecting a proper distribution of the gas to the various burners; the necessity for maintaining a so-called master burner being eliminated through the use of a small pilot which is independent of the burners.

In the drawings:—

Figure 1 is a side elevation of my improved generator shown provided with a pair of burners with a portion of one of said burners broken away.

Figure 2 is a plan view thereof.

Figure 3 is a detail sectional view taken on the line 3—3 of Figure 1.

Figure 4 is a longitudinal sectional view of the generator portion, with intermediate portions broken away.

Figure 5 is a cross sectional view taken on the line 5—5 of Figure 4.

Figure 6 is a vertical sectional view of the mixing chamber and distributing portion; the view being taken on the line 6—6 of Figure 1 looking in the direction of the arrows.

Figure 7 is a detail sectional view taken on the line 7—7 of Figure 6.

Figure 8 is a sectional view taken on the line 8—8 of Figure 6.

Figure 9 is a cross-sectional view similar to Figure 5, illustrating a modification of the generator.

Figure 10 is a side elevation of a modified form of mixing chamber and distributor.

Figure 11 is a vertical sectional view of same.

Figure 12 is a longitudinal sectional view of a modified form of generator.

Figure 13 is a cross-section thereof taken on the line 13—13 of Figure 12.

The exemplification of the invention as illustrated in the drawings is especially adapted for use in a domestic cook stove or range or for water or house heating and involves the generator proper indicated at 15, consisting of an outer metallic tube 16 of suitable length and diameter which is provided with an internal tube 17 of suitable refractory material, preferably non-porous carbon, arranged in snug relation with the inner circumference of the outer tube 16 and extending throughout a major portion of the length of the outer tube. The remainder of the outer tube 16 is provided with a sleeve of refractory material or non-porous carbon band 18 arranged in end to end relation with the non-porous carbon tube 17, as shown in Figure 4.

The tube 17 is of comparative thickness and provided with a bore of diameter just sufficient to receive valve-stem 19. The inner circumference or bore of the carbon tube 17 is preferably provided with one or more longitudinally disposed small slots or slits 20 which radiate from the bore of the tube as shown in Figure 5 and which in turn communicate with the bore 21 of coupling 22 which is threaded or otherwise suitably secured to one end of outer tube 16 of the generator proper. The coupling 22 is provided with a gland-nut and suitable packing as indicated at 23 in Figure 4 to provide a fluid-tight shell about the valve-stem 19 rearward of the inlet nipple 24, of the coupler; the nipple 24 being provided with the supply tube 25 leading from a suitable supply of hydrocarbon fuel which may be fed to the generator under pressure or by means of gravity. The bore of the tube 17 is of size just sufficient to receive the valve stem 19 so that the hydrocarbon fuel admitted by the inlet nipple will pass through the bore 21 of coupler 22 and into the radiating slots or slits 20. The slot or slits 20 are of minute transverse dimensions in order that a very thin film of hydrocarbon fuel may pass therethrough. The slits 20 may extend to a point adjacent to the outer perimeter of the tube 17 so as to present a thin non-metallic wall between the hydrocarbon and the outer metal tube; thus bringing the hydrocarbon liquid path into close proximity to the hottest portion of the generator. The tube 17 is of suitable refractory material, such as carborundum, magnesia or the like, being preferably of a carbon made impervious to the liquid fuel and which also exercises a catalytic effect on the thin film of hydrocarbon passing through the generator. The tube 17 is shown preferably provided with a plurality of slits 20, but in actual operation at least for certain uses, a number of these slits may be blocked off by the insertion of thin strips of metal or wires, thereby controlling or diminishing the quantity of fuel going through the generator. For normal operation, one of these slits or cuts are sufficient, but in the event this slit or cut should become clogged or in some way made inoperative, the generator may still be employed upon removal of the wire from the other slit and the efficiency of the generator thus maintained.

It has been found in practice that where the hydrocarbon fuel comes into contact with heated metal, especially with metal at substantially red heat, the hot metal surface tends to scale and results in the formation of carbon. With my improved generator, the hydrocarbon fuel does not come into contact with the extraneously heated outer shell or tube 16 because the catalytic tube 17 fits snugly therein and the hydrocarbon fuel is compelled to flow through the thin slot or slots 20; and although the hydrocarbon fuel contacts with the metal valve stem 19, (where such valve stem is employed) carbonization is not likely to occur because the metal stem 19 is not heated to a red heat by reason of the protective covering provided by the tube 17; the hydrocarbon fuel being made to flow through a path removed from the incandescent metal. It is obvious, however, that the slots or slits may be differently formed and of different configuration from that disclosed in the exemplification of the invention shown in Figure 5.

The slots 20 communicate at their inner ends with the enlarged bore 26 of the non-metallic sleeve or carbon band 18 located at the inner end of the generator; the adjacent end of bore 26 permitting expansion of the vaporized fuel. The inner end of the outer tube 16 receives the metal nipple 27 which is provided with a guide stem 28 threaded internally to receive the threaded portion 29 of the valve stem 19. The stem 28 of the nipple 27 extends into sleeve 18, being slightly smaller in external diameter than the diameter of the bore 26 of the sleeve 18 to provide the thin passage 30 about the stem 28 for the vaporized fuel. The thin circular passage 30 communicates with small radially disposed ports 31 arranged in the nipple 27 and leading to the space surrounding the inner end of valve-stem 19 in advance of the valve-seat 32. The vaporized fuel will pass through the opening in nipple 27, when the valve-stem 19 is off its seat 32, and flow through the small port in the nipple 27 about the gradually reduced end of the stem and into the removable tip 33 provided with a minute bore 34 through which the clean-out needle 35 extends. The clean-out needle 35 is minutely smaller than the port 34 in the tip 33 so that the vaporized fuel may discharge through the port 34 about the clean-out needle 35.

The valve-stem 19 beyond the valve-seat 32 is preferably gradually reduced as shown in Figure 4 in order to somewhat reduce the fuel passage when the stem is off its seat 32; the restriction being offered by the portion 29a. The needle 35 which does not completely close the minute port 34 in the tip 33 moves lengthwise of the port 34 whenever the valve-stem is operated and thereby keeps the port 34 free of obstruction.

The generator is mounted in the upstanding brackets or ends 36, 36 of a primer cup and pilot member 37 having a gas passage or channel 38 provided with a suitable number of burners or tips 39 arranged below the generator 15. The member 37 around the burners 39 is shallow or cupped to receive alcohol or other suitable priming medium which is introduced through a cupped tube 40, the end whereof is screwed into an opening in the outer end wall 36 as shown at 41. The cupped tube 40 is shown provided with an outwardly disposed lug 42 which is preferably flat sided and bears against the bottom of the squared end of coupling 22 and thus prevents rotative or tilting movement of the generator 15 during operation of the generator valve.

The outer end of nipple 27 of the generator with the tip 33 extends through the opening in inner end wall 36 and beneath the hooded end 43 of a skeleton shield frame 44. The frame portion 44 fits over the upstanding ends 36 of the pilot member; while the hooded end extends beyond inner end wall 36 and encloses the space (except at the bottom where it is open to atmosphere) between the end wall 36 and the inlet opening of a mixing chamber 45 in the casting 46. With the hood portion 43 open at bottom, air is entrained with the vapor issuing from tip 33 of the generator and injected into the mixing chamber. In order that the quantity of air may be controlled, I show the inlet opening 45ª of the mixing chamber 45 provided with a loosely mounted thimble or sleeve 47 which may be moved in or out to vary the distance between the generator tip 33 and the inlet 45ª.

The casting 46 constitutes a mixing chamber portion and a distributing portion. The mixing chamber 45, which receives the vaporized fuel and air through inlet 45ª and causes a thorough mixing and gasification, is shown in the form of a curving passage, see Figure 7, with the inner end extending downwardly toward the bottom of the casting as shown at 45ᵇ, Figure 6, and communicates with a bottom chamber 48 which receives one end of the pilot gas passage 38, thereby providing gasified fuel for the pilot burners 39. The side wall of casting 46 is provided with a pipe 49, see Figures 1 and 2, which leads from pilot feed chamber 48. The outer end of pipe 49, which curves toward the casting 46, is provided with a burner grid or tip as at 50 disposed adjacent to the casting 46; and the pipe 49 is also provided with a gas regulating valve 51. With this arrangement the casting 46 is heated and the gasified vapor in the mixing chamber superheated in its passage to the distributing portion of the casting 46.

The casting 46 is provided with a partition or wall 52 above the main portion of the mixing chamber 45, and this wall is provided with a port 53 (see Figure 6) which communicates with the distributor portion or chamber 54 of the casting 46.

The distributor chamber 54 is shown provided with a plurality of outlets 55; certain of which are shown provided with burners 56, of any suitable type and arrangement; while other ports or outlets 55 are shown closed by plugs 57. It is obvious, that if a greater number—or rearrangement of burners is desired, this may be readily accomplished by removing plugs 57.

The conduits leading to the burners 56 from outlets 55 of the distributor chamber are shown provided with suitable valves at 58, so that any one of the burners may be independently lighted to suit the needs of the operator, while at the same time flow of the gasified fuel to the burners may be prevented until the generator and mixing chamber have been heated to the proper degree.

The mixer and distributor casting 46 is so arranged relative to the main generating portion 15 and the respective burners 56, that rapid vaporization and gasification can be maintained during operation; the inrushing or injected hydrocarbon vapor and air being caused to travel in contact with heated surfaces in a manner which ensures a complete vaporization and gasification to be maintained; my improved structure greatly reducing and practically eliminating the tendency of carbonization and condensation. Furthermore, a construction is provided which will automatically clean itself of any condensation or liquid fuel injected by faulty operation, without necessitating the entire dismantling or dissociation of all parts of the device; the lowest point in the mixing chamber 45 being provided with a clean-out opening or port at 59.

Furthermore, an automatic or self-cleaning construction is provided, obviating the necessity of entirely dismantling the device; and at the same time providing a construction wherein the quantity of gasified fuel admitted may be independently controlled whether all of the burners are in operation or not and hence permitting a saving of fuel. In most hydrocarbon burner devices now in use, a master burner is employed, which serves both as a burner and as a distributor for the other burners. With such constructions, the non-operation or inoperative condition of the master burner prevents operation of the other burners. With my construction, a combination of heated mixing chamber and distributor is provided to which the burners are secured and arranged to be independently and separately controlled by suitable gas valves. The gas mixing chamber is provided with a port somewhat smaller than the port 53 for the distributing chamber 54, whereby gas is admitted to passage 48, which conveys gas to the pilot and thus permits the generator to be constantly heated and generation to be maintained; such generation, in the event all burners are shut off, being regulated by the generator valve, so that merely enough gas to feed the pilot flame will be created.

As is apparent from the construction shown, the gas for the pilot is not taken from the distributing chamber from which the burners are supplied, but is taken from the mixing chamber in advance of flow into the distributing chamber 54, with the result that a more uniform flow to the burners is obtained and fluctuation of the burner supply prevented.

In Figure 10 I illustrate a simpler form of combined mixer and distributor comprising a chambered casting 61 having an inlet 62 leading to a mixing chamber 63. The inlet 62 is also shown provided with the slidable thimble 47 for regulating the distance between the discharge end of the generator (not shown, but which is similar to the generator previously described and mounted in the same manner by the upstanding walls 36, 36 of the pilot) and the casting 61 and thereby controlling the amount of air to be entrained with the vapor entering inlet 62.

The casting 61 is shown provided with an inner wall or diaphragm 64, preferably formed to induce upward flow of the gas. The wall 64 has an opening 65 whereby some of the gas is admitted to a lower pilot feed chamber 66 which has an outlet in which the end of the pilot tube 38 is secured; and the bottom of this chamber 66 is shown provided with the clean-out plug 59.

The upper end of mixing chamber 63 communicates with the distributing head or chamber 67 which, like distributing head 54, is provided with a suitable number of burner receiving openings.

The tops of distributing heads 54 and 67 are shown provided with one or more upstanding tapped lugs 68, which afford means for suspending the devices in place from a suitable overhead supporting grill or frame In Figures 3, 4 and 5, I show the minute fuel passages in the generator by providing longitudinal slits 20 on the inner perimeter of the carbon tube 17. It is apparent, however, that these passages for obtaining a flow of hydrocarbon in thin film form may be provided by providing the narrow slits in the valve-stem 19 as shown at 69 in Figure 9 instead of in the carbon tube 17ª.

Where a generator is to be employed without the use of a needle valve as in Figures 4 and 9, the minute passages may then be provided as shown in Figure 12, where the generator portion consists of the inlet nipple 70, which connects with a tube leading from a source of hydrocarbon supply controlled by any suitable valve (not shown). The nipple 70 has an enlarged outlet end to receive the outer metal tube 16 in which is located a carbon tube 71 of length somewhat less than the length of outer tube 16. The carbon tube 71, like carbon tube 17, is provided on its inner perimeter with one or more longitudinal slots 72 and the passage through the tube 71 (except for the minute slots 72) is closed by a carbon stick 73, so that the hydrocarbon is made to pass in thin film form through the generator. The outlet end of the outer tube 16 is provided with an outlet nipple 74 substantially similar to nipple 27 and provided with the tip 33. The nipple 74 is shown somewhat shorter than nipple 27 in order to provide an expansion space between its inner end and the ends of carbon tube 71 and carbon stick 73, in which space I provide a suitable spring 75 which tends to hold the tube and stick in the position shown.

It will be understood that the generator shown in Figure 12 may be mounted in the pilot shown and previously described; with the generated vapor discharging adjacent to the inlet of the mixing chamber 45 of member 46 or of mixing chamber 63 of member 61.

The supply of gas for the pilot may either be controlled by a suitable valve or by providing the pilot tube 38 at its inlet with a washer or element having a hole of a size designed to provide the desired flow of gas to the pilot.

My invention involves a new method of generating a gas from hydrocarbon fuel, consisting in forcing the fuel in the form of a thin film through minute heated channels of catalytic material heated to a proper temperature, as for example between 150° to 550° F., causing the oil to be vaporized and in its vaporized form to pass into a heated mixing chamber with a predetermined quantity of air whereby a uniform hydrocarbon is provided without deposit of carbon.

As is apparent from my specification, one object of my invention is to provide a generator constructed to provide a minute passage or passages for the hydrocarbon fuel whereby the oil is made to flow in the nature of a thin film and preferably in contact with a material designed to have a catalytic action on the fuel. I have spoken of the use of a tube of carbon impervious to the oil, but it will be understood that other material having a catalytic action may be employed without departing from the spirit of my invention; the terms employed in the specificaton being merely terms of descrption and not terms of limitation, as structural modifications may be made without, however, departing from the spirit of my invention.

What I claim is:

1. A device of the character described comprising a chambered casting provided with a mixing chamber, a distributing chamber having communication with the mixing chamber, a pilot feeding chamber having communication with said mixing chamber in advance of the point of communication between the mixing chamber and distributing chamber, a metallic tube mounted at one side of the casting adjacent to the inlet end of the mixing chamber, a non-porous non-metallic tube arranged within and in snug fitting relation with said metallic tube and having minute oil passages therethrough arranged out of contact wth said metallic tube, said passages at the discharge ends of the tubes terminating in a common passage of larger dimensions to permit expansion of the vaporized oil, and a valve provided with a stem disposed through and in close fitting relation with said inner tube for controlling the discharge of the vaporized fuel into said mixing chamber.

2. A device of the character described comprising a casting provided with a chamber constituting a mixing chamber having an inlet opening at one side of the casting, said mixing chamber having a portion extending to the bottom of the casting provided with a drain in the bottom of the casting, a second chamber in the casting disposed above the mixing chamber and communicating therewith, a pilot feeding chamber having communication with the lower portion of the mixing chamber, a metallic tube mounted adjacent to the inlet end of the mixing chamber, a non-porous tube of refractory material extending lengthwise within said metallic tube and provided with minute oil passages arranged out of contact with the metallic tube, said passages terminating at the inner end in a common passage to permit expansion of the vaporized oil, a control valve, the stem whereof extends through and has close fitting contact with the inner perimeter of said inner tube for controlling the discharge of the vaporized fuel into the mixing chamber.

3. A device of the character described comprising a casting having a mixing chamber provided with an inlet opening in one side of the casting, a portion of the mixing chamber extending to the bottom of the casting and provided with a drain, a distributing chamber arranged above the mixing chamber and in communication therewith at a point removed from the inlet end of the mixing chamber, an air controlling tube slidable in the inlet end of the mixing chamber, a generator mounted adjacent to the inlet of the mixing chamber and comprising an outer metallic tube, a non-porous element of refractory material arranged within and snugly fitting said metallic tube and provided with minute oil passage lengthwise thereof arranged to maintain the oil out of contact with the metallic tube, a second non-porous element of refractory material at the discharge end of said outer tube having an enlarged opening therethrough communicating with said minute passage in the first mentioned non-porous element, and a valve arranged at the discharge end of said second non-porous element for controlling the discharge of the vaporized fuel into said mixing chamber.

4. A device of the character described comprising a casting provided with a chamber, a portion whereof extends to the bottom of the casting and is provided with a drain, a distributing chamber above the mixing chamber in communication therewith and at a point removed from the inlet end of the mixing chamber, a metallic tube mounted adjacent to the inlet end of the mixing chamber, a non-porous tube of refractory material arranged within and in close fitting relation with the metallic tube, said second tube having minute oil receiving slots arranged lengthwise thereof out of contact with the metallic tube, all of said slots at the inner end terminating in a common passage adapted to permit expansion of the vaporized oil, a valve at the discharge end of the tubes for controlling discharge of the vaporized fuel into the mixing chamber, a pilot arranged lengthwise of said outer tube, and a gas conveying connection between the mixing chamber and said pilot.

5. In a device of the character described, a casting provided with a mixing chamber and a distributing chamber arranged in communication with each other at a point removed from the inlet end of the mixing chamber, the distributing chamber being provided with a plurality of controllable burner receiving openings, a generator comprising a metallic tube mounted adjacent the inlet end of the mixing chamber, a non-porous inner tube of refractory material provided with minute oil passages therethrough arranged out of communication with the metallic tube, said oil passages terminating at the inner end in a common passage, a valve for controlling the discharge from said common passage, regulable means at the inlet end of said mixing chamber for controlling the space between the discharge end of the generator and the inlet of the mixing chamber, a pilot disposed adjacent to the outer tube, and a gas connection between said mixing chamber and the pilot in advance of the point of communication between the mixing chamber and said distributing chamber.

6. A device of the character described comprising the combination of a casting having a mixing chamber and a distributing chamber arranged in communication with each other, with a generator comprising a metallic tube arranged in alignment with the inlet end of the mixing chamber, non-porous cylindrical means of refractory material arranged in snug fitting relation within the metallic tube and having minute oil passages arranged out of contact with the metallic tube, a valve for controlling discharge of the vaporized fuel into the mixing chamber, a pilot disposed lengthwise of said metallic tube and having connection with the mixing chamber, a superheating burner adjacent to said casting having a controllable connection with said mixing chamber, and a primer cup formed integral with said pilot.

7. In a device of the character described, the combination of a casting provided with a mixing chamber having an inlet in the side of the casting, said chamber in its bottom being proivded with a controllable drain, a distributing chamber in the casting above the mixing chamber and having communication therewith at a point removed from the inlet, a pilot-receiving opening in the side of the casting at a point beneath said mixing chamber inlet and communicating with the bottom of the mixing chamber, air regulating means at the mixing chamber inlet, with a generator composed of a metallic tube mounted in alignment with the inlet end of the mixing chamber, a non-porous tube of refractory material arranged in snug fitting relation within said outer tube and provided with minute oil passages disposed lengthwise thereof out of contact with the metallic tube, said passages at the inner end terminating in a common passage, a valve for controlling the discharge from the generator, and a plurality of independently controlled burners communicating with said distributing chamber.

8. In a device of the character described, a generator comprising a metallic tube, cylindrical non-porous carbon material arranged in close fitting relation within the metallic tube and provided with minute oil passage therethrough at a point removed from the walls of the metallic tube, a pilot member provided with upstanding apertured end walls in which the generator is mounted, said pilot member being formed to receive a priming fluid, and a skeleton shield member seatable on said end walls and disposed lengthwise of the pilot member.

9. In a device of the character described, a generator comprising a tube provided with a discharge nozzle at one end, a pilot member provided with side walls and upwardly extended end walls, said end walls being formed to receive said generator tube, one of said end walls being provided with an opening, a priming fluid receiving element secured in said opening, said element being formed to hold the generator against rotation, and a skeleton shield disposed lengthwise of the pilot member and mounted on said end walls, said shield terminating in a hood disposed beyond the pilot member end wall in which the discharge nozzle of the generator is mounted.

10. In a device of the character described, a member provided with a mixing chamber having an inlet opening and a pilot supplying chamber, a distributing chamber located above and in communication with the mixing chamber, a burner arranged adjacent to said member and having gas supplying connection with the mixing chamber, regulable air admitting means at the inlet opening of said chamber, a clean-out opening in the bottom of the mixing chamber, and means whereby said member may be supported in place.

11. In a device of the character described, a generator comprising an outer metallic member, a non-porous carbon member extending lengthwise within the outer member in snug relation therewith, a third member extending lengthwise of the bore of the second member in close relation therewith, one of the last two mentioned members being provided with a minute groove extending lengthwise of said members to provide a minute passage whereby the oil is made to flow in the form of a thin film, at least one wall of said passage being formed by the non-porous carbon member having a catalytic action on the oil, and means for heating said member.

12. In a device of the character described, a combined mixing chamber, a distributing chamber arranged above and in communication with the mixing chamber, a pilot feeding chamber arranged in the mixing chamber unit beneath the mixing chamber and in communication therewith, the mixing chamber being provided with an inlet opening while the bottom of said chamber is provided with a clean-out opening, the distributing chamber being provided with a plurality of controllable outlets, and means whereby the combined mixing chamber and distributing chamber may be suspended in place.

GUSTAVE F. SCHMIDT.